US008787151B2

(12) United States Patent
Polland et al.

(10) Patent No.: US 8,787,151 B2
(45) Date of Patent: Jul. 22, 2014

(54) N+N PROTECTION SWITCHING

(75) Inventors: Joe Polland, Eden Prairie, MN (US); Clifton Powers, Raleigh, NC (US); Manish Sharma, Eden Prairie, MN (US); Laxman R. Anne, Eden Prairie, MN (US); Yiu Lam Chan, Raleigh, NC (US)

(73) Assignee: ADC DSL Systems, Inc., Shakopee, MN (US)

( * ) Notice: Subject to any disclaimer, the term of this patent is extended or adjusted under 35 U.S.C. 154(b) by 308 days.

(21) Appl. No.: 13/187,308

(22) Filed: Jul. 20, 2011

(65) Prior Publication Data
US 2013/0022094 A1  Jan. 24, 2013

(51) Int. Cl.
*H04L 1/00* (2006.01)
(52) U.S. Cl.
USPC .......................................... 370/217; 370/225
(58) Field of Classification Search
USPC .......................................... 370/216–228, 389
See application file for complete search history.

(56) References Cited

U.S. PATENT DOCUMENTS

| | | | | |
|---|---|---|---|---|
| 5,546,422 | A * | 8/1996 | Yokev et al. | 375/134 |
| 7,200,110 | B1 * | 4/2007 | Burns et al. | 370/225 |
| 7,242,860 | B2 | 7/2007 | Ikeda et al. | |
| 7,272,209 | B2 | 9/2007 | Jiang et al. | |
| 7,443,789 | B2 | 10/2008 | Glaser et al. | |
| 7,864,667 | B2 | 1/2011 | Zhou et al. | |
| 7,869,464 | B2 | 1/2011 | Polland et al. | |
| 2003/0095502 | A1 | 5/2003 | Glaser et al. | |
| 2005/0105473 | A1 * | 5/2005 | Hausman et al. | 370/249 |
| 2006/0062206 | A1 | 3/2006 | Krishnaswamy | |
| 2006/0274647 | A1 * | 12/2006 | Wang et al. | 370/216 |
| 2008/0285437 | A1 | 11/2008 | Polland | |
| 2009/0290603 | A1 | 11/2009 | Zhou et al. | |
| 2013/0021899 | A1 | 1/2013 | Polland et al. | |

FOREIGN PATENT DOCUMENTS

WO  WO/2010/047629  4/2010

OTHER PUBLICATIONS

Cisco Systems Inc., "Cisco Symmetric High-Bitrate DSL High Speed WAN Interface Cards for Cisco Integrated Services Routers", 1999-2006, Publisher: Cisco Systems, Inc.
Yaakov Stein, "Automatic Protection Switching", Apr. 2009, Publisher: RAD Data Communications.
Thomson Gateway, "SHDSL Configuration Guide R8.2 and Higher", "http://www.thomson-broadband.com", Jun. 2008, Published in: Belgium.
International Searching Authority, "International Search Report", "from Foreign Counterpart of U.S. Appl. No. 13/187,308", Dec. 20, 2012, pp. 1-9, Published in: WO.
International Searching Authority, "International Search Report", "from Foreign Counterpart of U.S. Appl. No. 13/187,306", Jan. 17, 2013, pp. 1-9, Published in: WO.
The International Bureau of WIPO, "International Preliminary Report on Patentability from PCT Application No. PCT/US2012/047412 mailed Jan. 30, 2014", "from PCT Counterpart of U.S. Appl. No. 13/187,308", Jan. 30, 2014, pp. 1-6, Published in: WO.

* cited by examiner

*Primary Examiner* — Andrew Chriss
*Assistant Examiner* — Kenan Cehic
(74) *Attorney, Agent, or Firm* — Fogg & Powers LLC

(57) ABSTRACT

A communication system comprises a plurality of DSL links comprising a first group and second group of DSL links, each group comprising more than one DSL link. The communication system also comprises a first node and a second node each having at least one application port and a plurality of DSL ports. Each DSL port is coupled to a respective one of the DSL links such that the first and second nodes are communicatively coupled via the DSL links. Each of the first and second nodes is configured to interleave a first copy of data received over the respective application port across the first group and to interleave a second copy of the data across the second group. When a failure is detected on a DSL link in the first group, each of the first and second nodes is configured to switch from the first group to the second group.

14 Claims, 12 Drawing Sheets

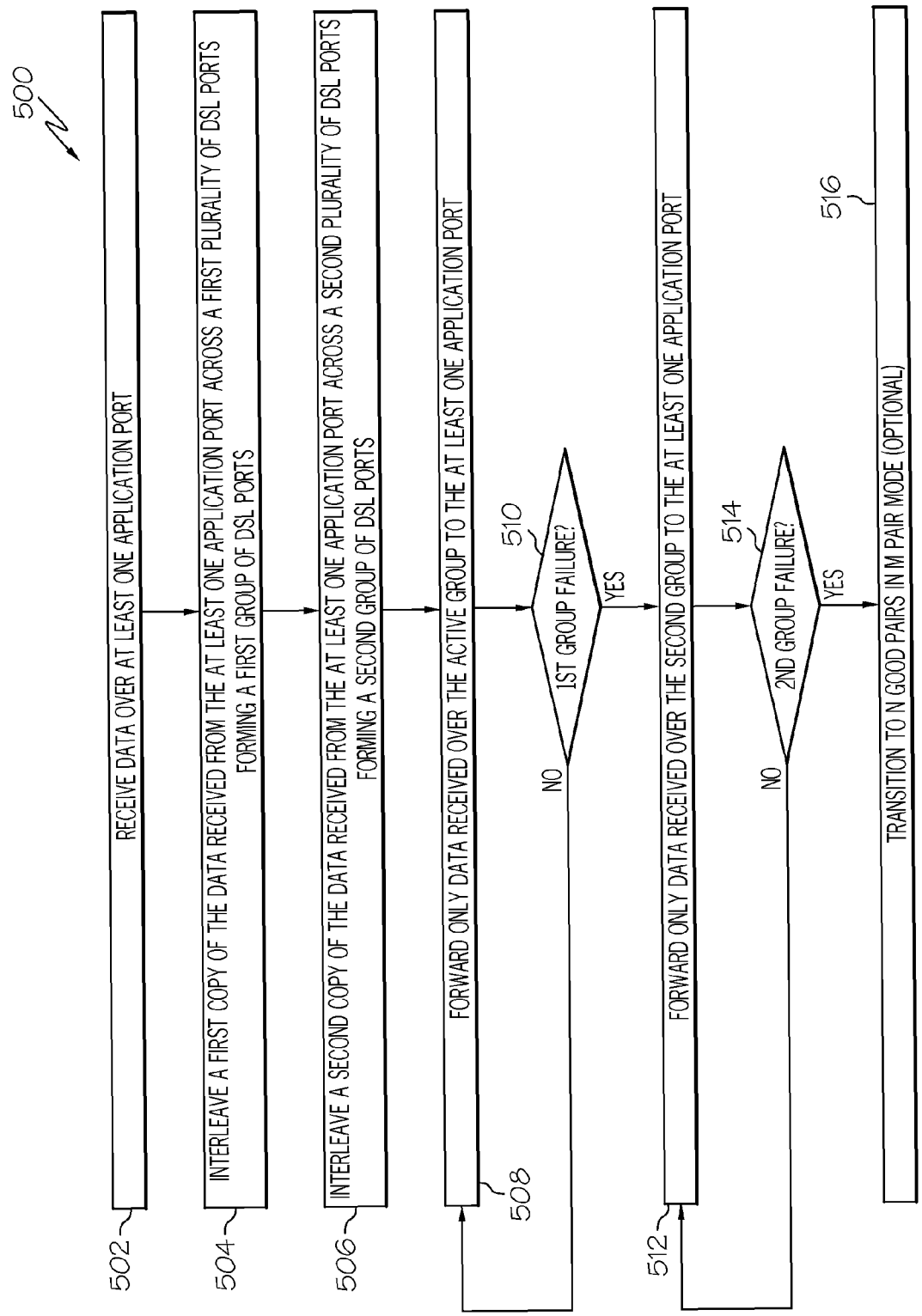

N+N PROTECTION SWITCHING

CROSS-REFERENCE TO RELATED APPLICATIONS

This application is related to co-pending U.S. patent application Ser. No. 13/187,307 entitled "M-PAIR MODE PROTECTION SWITCHING" filed on even date herewith and which is referred to herein as the '1185 application. The '1185 application is hereby incorporated herein by reference.

BACKGROUND

A typical digital subscriber line (DSL) communication network consists of a central unit and remote units, connected together by DSL. Each unit can be equipped with various application interfaces or ports, such as G.703, Ethernet, and Nx64k. The data received from the application ports is transported between DSL units over DSL links, such as over G.SHDSL (G.991.2) interfaces.

SUMMARY

In one embodiment, a communication system is provided. The communication system comprises a plurality of digital subscriber line (DSL) links comprising a first group of DSL links and a second group of DSL links. Each of the first and second groups comprises more than one DSL link, wherein the first group comprises the same number of DSL links as the second group. The communication system also comprises a first node having at least one application port and a plurality of DSL ports. Each DSL port is coupled to a respective one of the plurality of DSL links The communication system also comprises a second node having at least one application port and a plurality of DSL ports, each DSL port coupled to a respective one of the plurality of DSL links such that the first and second nodes are communicatively coupled via the plurality of DSL links. Each of the first and second nodes is configured to interleave a first copy of data received over the respective at least one application port across the first group of DSL links and to interleave a second copy of the data received over the respective at least one application port across the second group of DSL links. The first group is designated as an active group and the second group is designated as a back-up group. When a failure is detected on one of the DSL links in the first group, each of the first and second nodes is configured to switch from the first group to the second group.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 5 is a flow chart depicting one embodiment of a method of communication in a network.

Figure 1A:
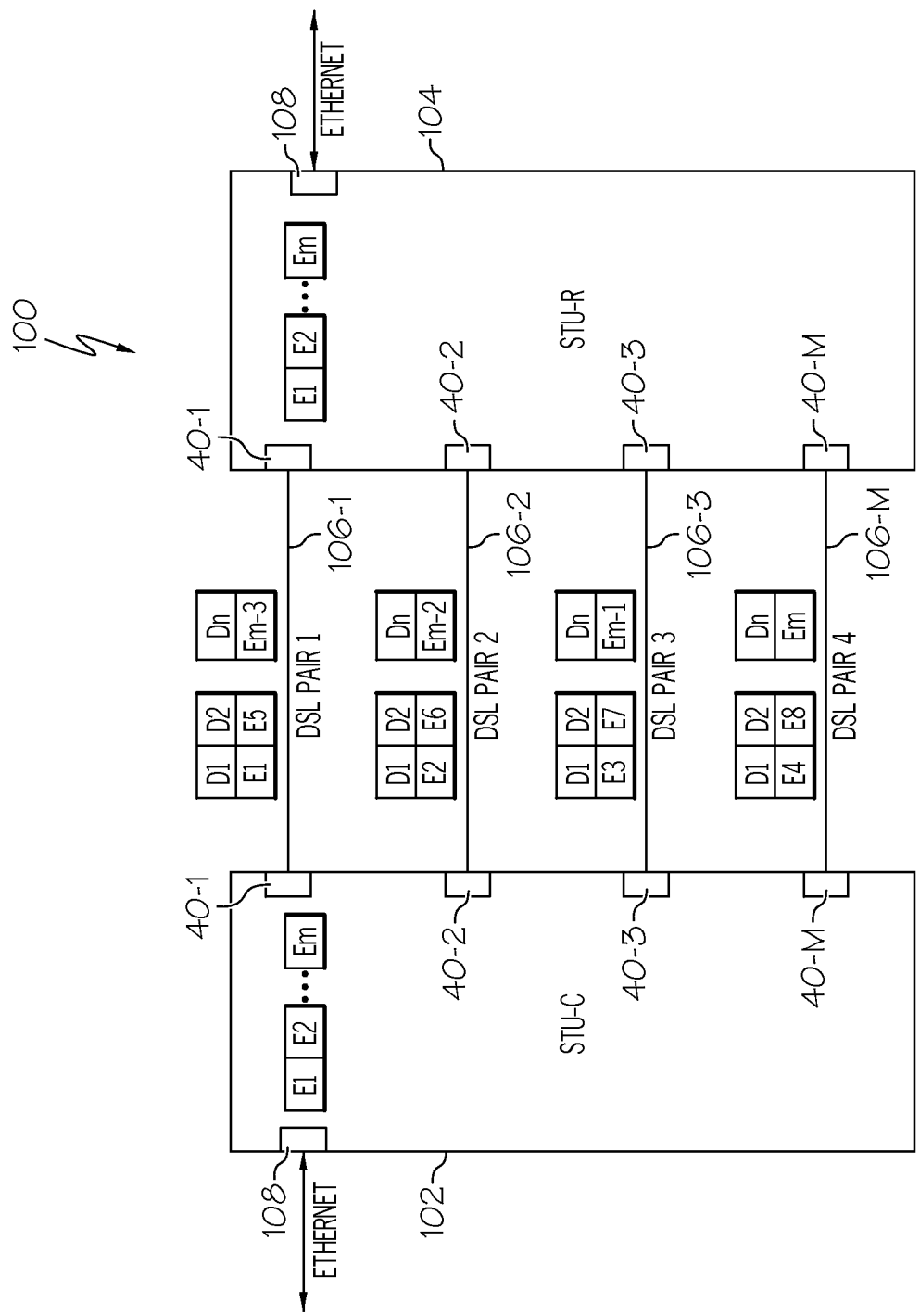
FIGS. 1A-1F are block diagrams of embodiments of a communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

N Good Pairs in M-Pair Mode

FIG. 1A is a block diagram depicting an exemplary communication system 100. The communication system 100 includes two digital subscriber line (DSL) units 102 and 104. The DSL units 102 and 104 are communicatively coupled together via a plurality of DSL pairs 106-1 . . . 106-M (also referred to herein as DSL links), where M represents the number of DSL pairs. In the embodiment shown in FIG. 1A, there are four DSL pairs. However, it is to be understood that, in other embodiments, other numbers of DSL pairs are used. Each DSL pair 106 is connected to a respective DSL port 40 in each of DSL units 102 and 104. In this embodiment, each of DSL units 102 and 104 are configured according to the Global.standard High-Bit-Rate Digital Subscriber Line (G.SHDSL) standard. However, it is to be understood that other DSL technologies can be implemented in other embodiments. In addition, in this embodiment, DSL unit 102 is configured as a central unit (also known as an STU-C) while DSL unit 104 is configured as a remote unit (also known as an STU-R).

Each of DSL units 102 and 104 also includes at least one application port 108. In this example, each of the at least one application ports 108 is configured for an Ethernet interface format. As used herein, Ethernet is a family of frame-based technologies defined in the Institute of Electrical and Electronics Engineers (IEEE) standard 802.3. Ethernet is an elastic service in that the data from an Ethernet packet can be divided into varying numbers of DSL timeslots for transport between the DSL units 102 and 104. Thus, an elastic service is defined as a service for which the data can be divided into varying numbers of DSL timeslots. In other words, an elastic service does not require a fixed number of DSL timeslots. For example, the payload of an Ethernet packet received at the application port 108 is extracted from the packet, encapsulated and assigned to a number of allocated DSL timeslots. In particular, the Ethernet frames are encapsulated into high-level data link control (HDLC) format frames and then inserted into an internal pulse code modulation (PCM) timeslot stream as described in more detail below with respect to FIG. 2. The PCM timeslot stream is then mapped into DSL timeslots. If the original number of allocated DSL timeslots is reduced, the PCM timeslot stream is also reduced accordingly to maintain an equivalent number of timeslots and is then mapped to the reduced number of allocated DSL timeslots. Thus, the Ethernet frames are still transported over the reduced number of timeslots. However, since the number of timeslots was reduced, the amount of time it takes to complete transmission of the Ethernet frames is increased. Thus, Ethernet does not require a fixed number of DSL timeslots for transmission to be completed. If there are bursts of Ethernet traffic that exceed the allocated timeslot bandwidth, a protocol such as 802.3x Ethernet flow control protocol may be optionally used to implement flow control accross the Ethernet port until a channel is available.

In contrast, a non-elastic service such as Nx64k or E1, cannot complete transmission over the reduced number of timeslots since the non-elastic services require a fixed number of timeslots or the transmission will typically fail. Thus, in this example, the elastic service is implemented using Ethernet. However, it is to be understood that other elastic services that do not require a fixed number of DSL timeslots can be used in other embodiments.

In addition, in this embodiment, DSL units 102 and 104 are operating in M-pair mode. In M-pair mode, DSL pairs 106 effectively create an aggregate bandwidth. For example, in some embodiments each DSL pair has a maximum bandwidth of 2.3 Mbits creating a maximum aggregate bandwidth of 4.6 Mbits in embodiments with two DSL pairs. However, it is to be understood that the maximum bandwidth is not used for transport of traffic in some embodiments. In particular, in some embodiments, each DSL pair is run at the minimum data rate required to transport the user data. For example, if a system having 4 DSL pairs transports 4 Mbits/second of user data traffic, each DSL pair is configured to be run at 1 Mbit/second, in some embodiments. Similarly, if the system having 4 DSL pairs transports 8 MBits/second of user data traffic, each DSL pair is configured to be run at 2 Mbits/second in such embodiments. Running at the minimum data rate needed for each DSL pair can result in improved reach and error ratios.

The aggregate bandwidth is implemented, in this example, by interleaving the PCM timeslot stream containing the Ethernet frames over the plurality of DSL pairs 106-1 . . . 106-M. For example, as shown in FIG. 1, each DSL pair is configured with D1 . . . Dn timeslots, where Dn is the total number of timeslots allocated to each DSL pair for the application port 108. The PCM timeslot stream is configured with Em timeslots, where Em is equal to the aggregate number of DSL timeslots. In this example, Em is equal to MxDn, where M is equal to 4 in this example and Dn is the same for each DSL pair. Since there are 4 DSL pairs in this example, Em is equal to 4xDn. Thus, the total number of timeslots available for the Ethernet frame is 4xDn. In addition, the number of timeslots available on each DSL pair is not the same as the other DSL pairs, in some embodiments. However, the total number of PCM timeslots, Em, remains equal to the aggregate number of DSL timeslots.

In this example, the first PCM timeslot, E1, is assigned to the first DSL pair 106-1, the second PCM timeslot, E2, is assigned to the second DSL pair 106-2, etc. After a timeslot has been assigned to DSL pair 106-M, the order begins again with the next timeslot being assigned to the first DSL pair 106-1 and so forth. This interleaving continues until the last PCM timeslot, Em, is assigned to DSL pair 106-M. Notably, although the last PCM timeslot Em is assigned to the last DSL pair 106-M, in this example, it is to be understood that the last Em timeslot can be configured to end on any of the DSL pairs 106. For example, if the number of timeslots allocated on the DSL pairs is not exactly divisible by the total number of DSL pairs, M, then the last timeslot will not end on the last DSL pair 106-M.

By interleaving the PCM timeslots, the aggregate bandwidth of the plurality of DSL pairs 106 is used to transport the Ethernet frames between the DSL units 102 and 104. At the other DSL unit, Ethernet timeslots are extracted from DSL timeslots and placed on an internal PCM timeslot stream. At the Ethernet interface, HDLC frames are extracted from the PCM timeslots, the HDLC encapsulation is error checked and is then removed, and the Ethernet frame is reconstructed and transmitted via the application port 108.

Figure 1B:
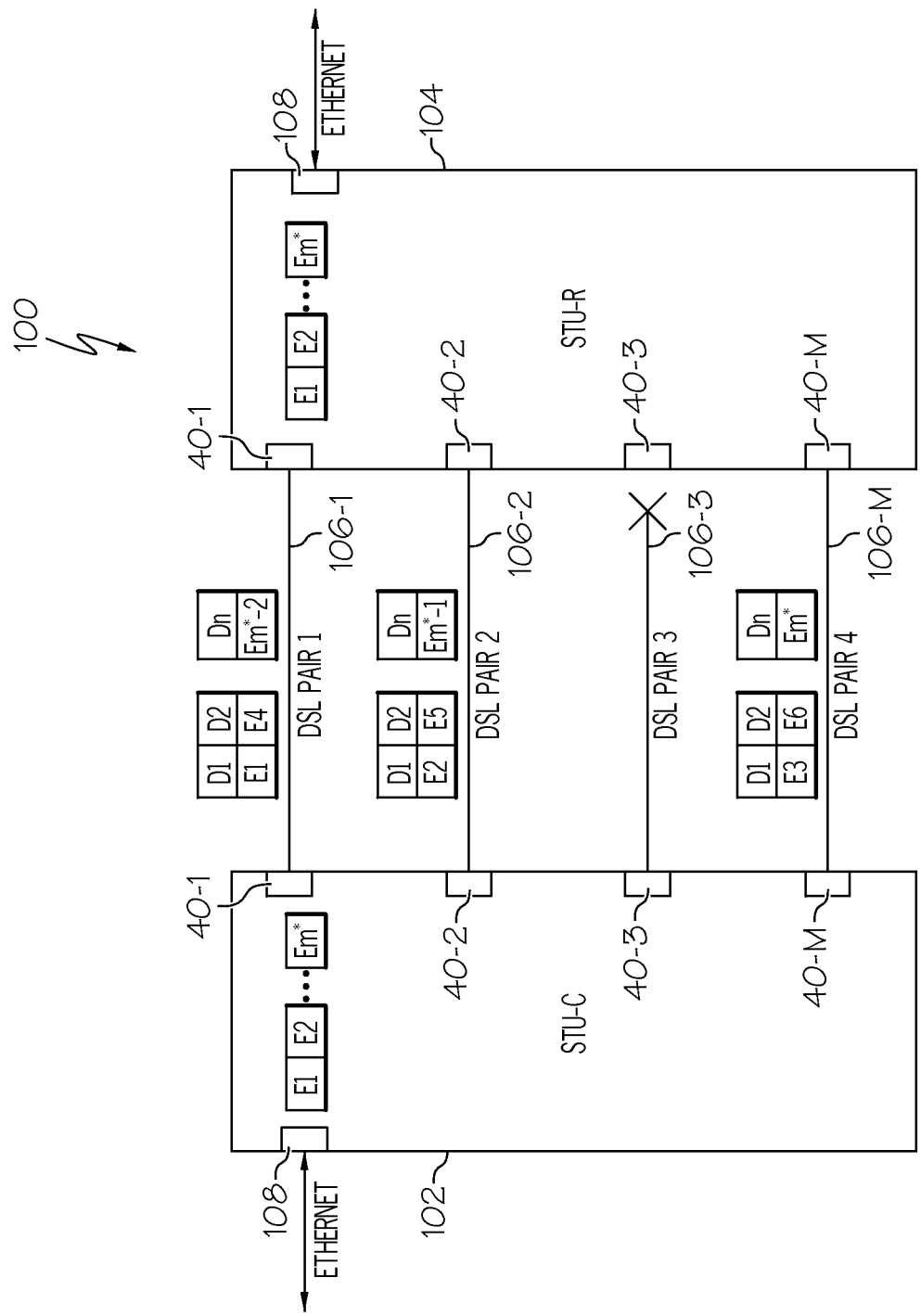

In the event that one of the DSL pairs 106 fails, such as DSL pair 106-3 in FIG. 1B, each of the DSL units 102 and 104 are configured to remap the PCM timeslot stream to the remaining DSL pairs 106. In particular, a new timeslot map is created to interleave the PCM timeslots between DSL pairs 106-1, 106-2 and 106-M. Initially, with four DSL pairs, there were Em timeslots available in this example. After the failure of DSL pair 106-3, the number of timeslots available is reduced to Em*, where Em* is equal to Em—(the number of timeslots allocated on DSL pair 106-3). For example, if the Ethernet timeslot service is configured with 100 timeslots, the timeslots are evenly distributed over the DSL pairs 106 by circularly and serially adding the timeslots to the DSL pairs 106. In this example, since there are four DSL pairs 106, each DSL pair 106 is assigned 25 timeslots per DSL frame. If one link fails, each remaining DSL pair 106 still has 25 timeslots. Thus, the number of available timeslots is reduced from 100 to 75 in this example.

Although the total number of timeslots is less after pair 106-3 fails, Ethernet is an elastic service, as described above, and can operate at a lower bandwidth. In some embodiments, when DSL failure is detected, 802.3x Ethernet flow control protocol may be optionally used on the Ethernet application ports 108 to halt traffic. Once the new timeslot map is created, 802.3x flow control is removed to allow traffic to resume with the new timeslot map.

The new timeslot map is defined in the DSL units 102 and 104 at the Ethernet application port side, and at the DSL port side. Each DSL pair 106 is configured to insert and extract different timeslots (i.e. insert for transmit, extract for receive). For example, using the new timeslot map at the DSL unit 102, DSL pair 106-1 is configured to insert and extract timeslots D1(E1), D2(E4), and DN(Em*-2), as shown in FIG. 1B, instead of D1(E1), D2(E5), and DN(Em-3), as shown in FIG. 1A. Thus, the new timeslot map divides the Ethernet payload among 75 timeslots rather than 100. Since the number of DSL timeslots was reduced, the time needed to complete transmission will increase. For example, prior to failure of DSL pair 106-3, the 100 PCM timeslots could be aggregated and transmitted in a single DSL frame (25 timeslots per frame per DSL pair). After the failure of DSL pair 106-3, there are 75 timeslots from the PCM stream and 25 DSL timeslots per frame on each of the remaining DSL pairs. Therefore, transmission of the Ethernet payload will require more time since 75 timeslots are used rather than the original 100 timeslots.

Figure 1C:
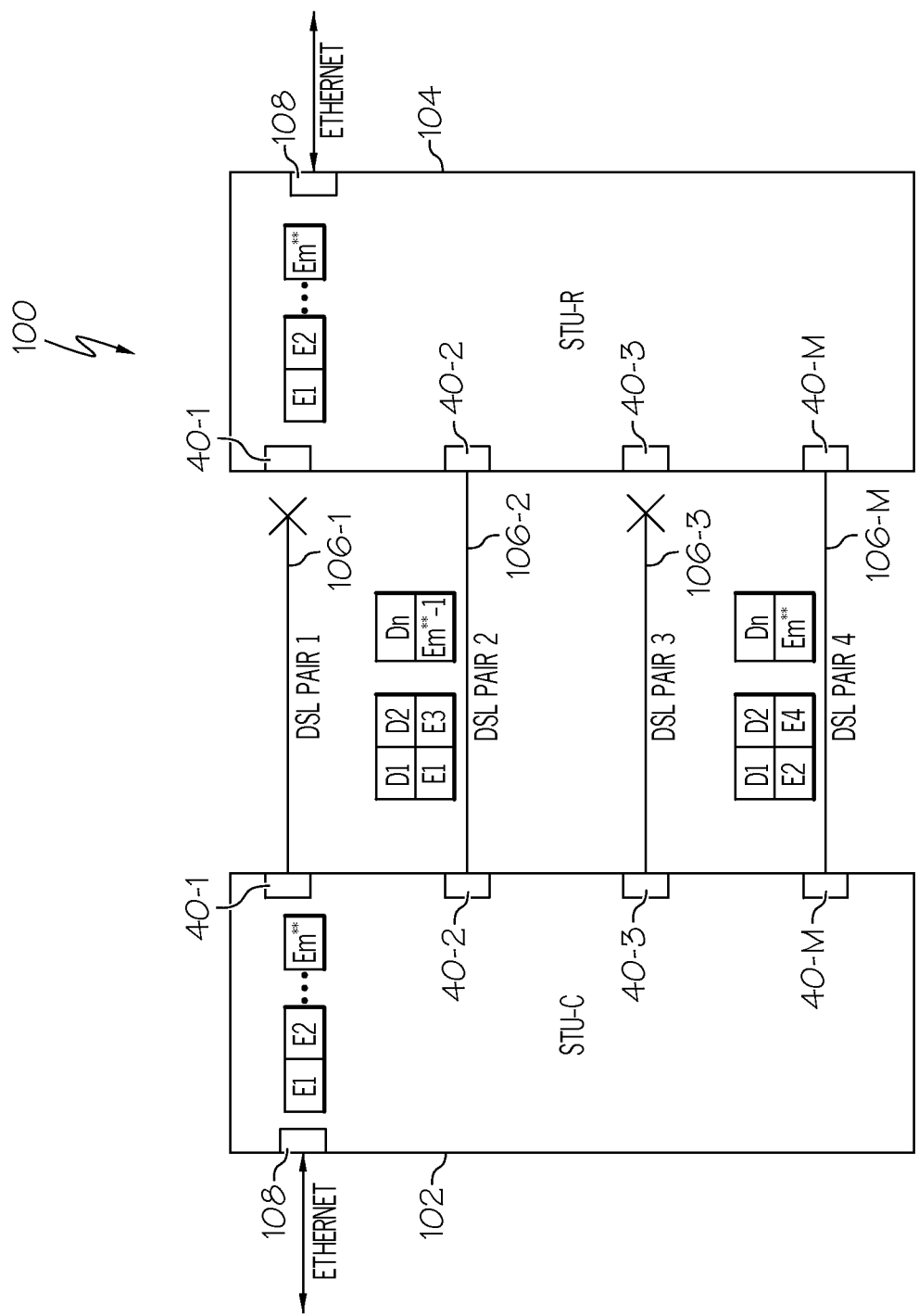

If another DSL pair 106 fails, such as DSL pair 106-1 in FIG. 1C, the DSL units 102 and 104 update the timeslot map again. In particular, a new timeslot map is created to interleave the PCM timeslots between DSL pairs 106-2 and 106-M. After the failure of DSL pair 106-1, the number of timeslots available is further reduced from Em* to Em, where Em is equal to Em—(the number of timeslots allocated on DSL pair 106-1 and 106-3). Thus, the Ethernet traffic is still communicated despite failure of multiple DSL pairs although with a smaller bandwidth. In some embodiments, if one of the failed DSL pairs recovers, the DSL units 102 and 104 are configured to create a new timeslot map that includes the recovered DSL pair. In other embodiments, a new timeslot map is not created even if one or more of the failed DSL pairs subsequently recovers. As used herein, the term "recovers" refers to correction or removal of the source of the error which caused the DSL link to fail.

Figure 1D:
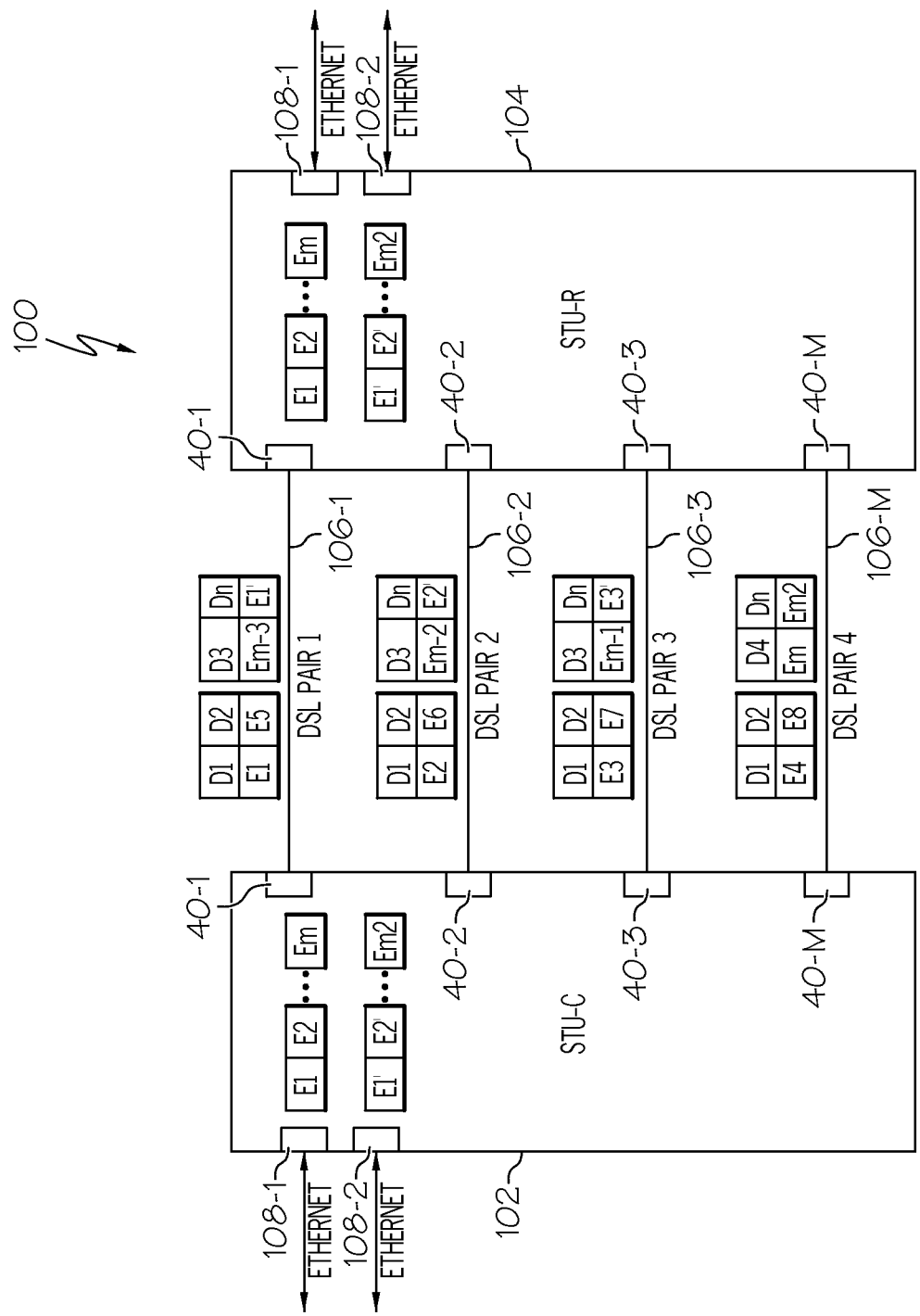
Figure 1E:
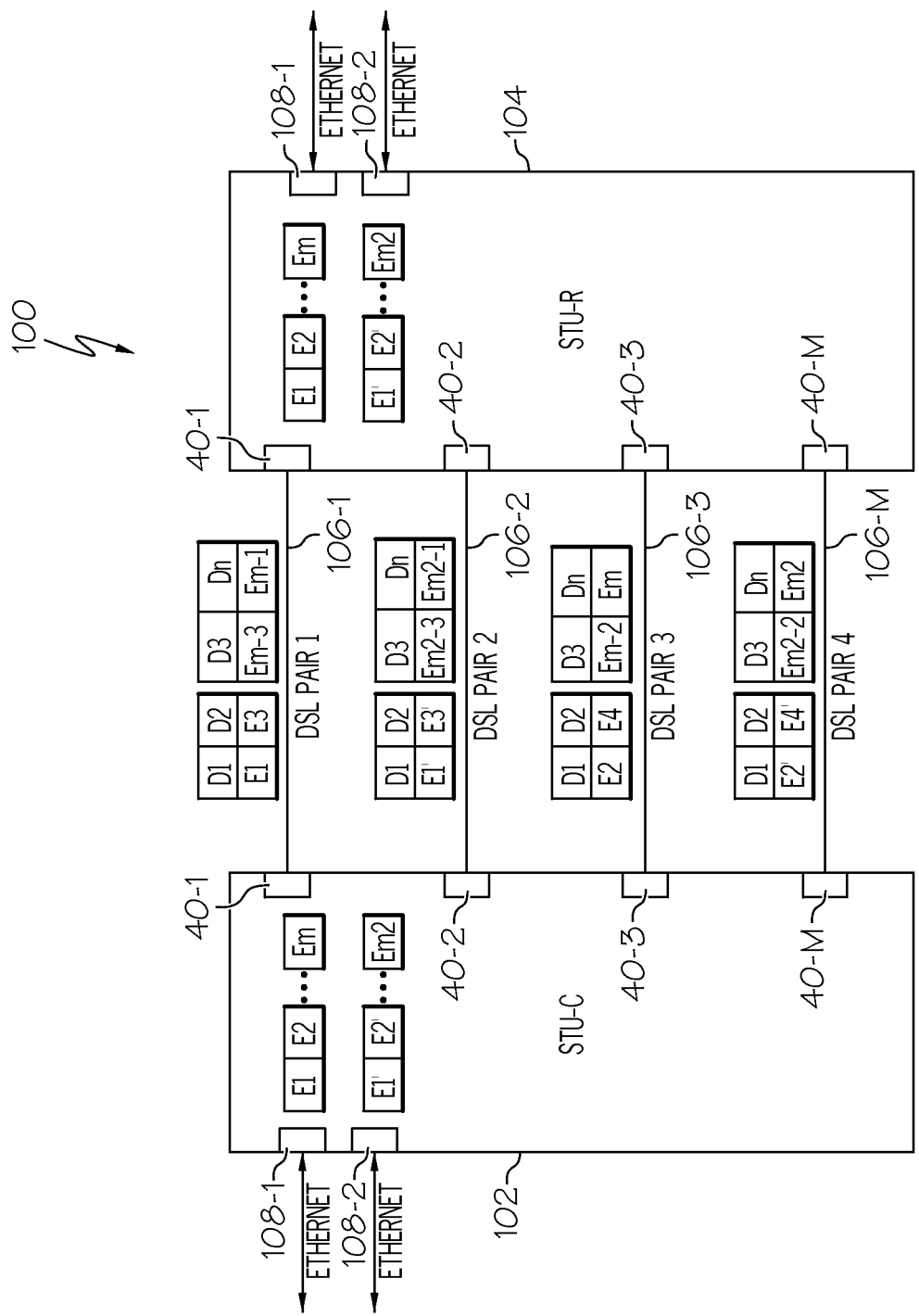

In addition, although only one application port 108 is shown in FIGS. 1A-1C, it is to be understood that more than one application port 108 can be implemented in other embodiments as shown in FIG. 1D. In the example shown in FIG. 1D, the timeslots from application ports 108-1 and 108-2 are interleaved circularly and serially. That is, the PCM timeslots from the first application port 108-1 are interleaved among the DSL pairs 106-1 . . . 106-M. After interleaving the timeslots from the first application port 108-1, the PCM timeslots from the second application port 108-2 are interleaved among the DSL pairs 106-1 . . . 106-M. Furthermore, in some embodiments having more than one application port 108, the data from the plurality of application ports is interleaved circularly and in parallel as shown in FIG. 1E. That is, the timeslots are not interleaved one application port at a time. For example, in FIG. 1E, a first time slot from application port 108-1 is assigned to the first DSL pair 106-1. Then, a first timeslot from the second application port 108-2 is assigned to the second DSL pair 106-2. A second timeslot from the first application port 108-1 is then assigned to the third DSL port 106-3 and so forth until all the timeslots from each of the application ports is assigned to one of the DSL ports.

Figure 1F:
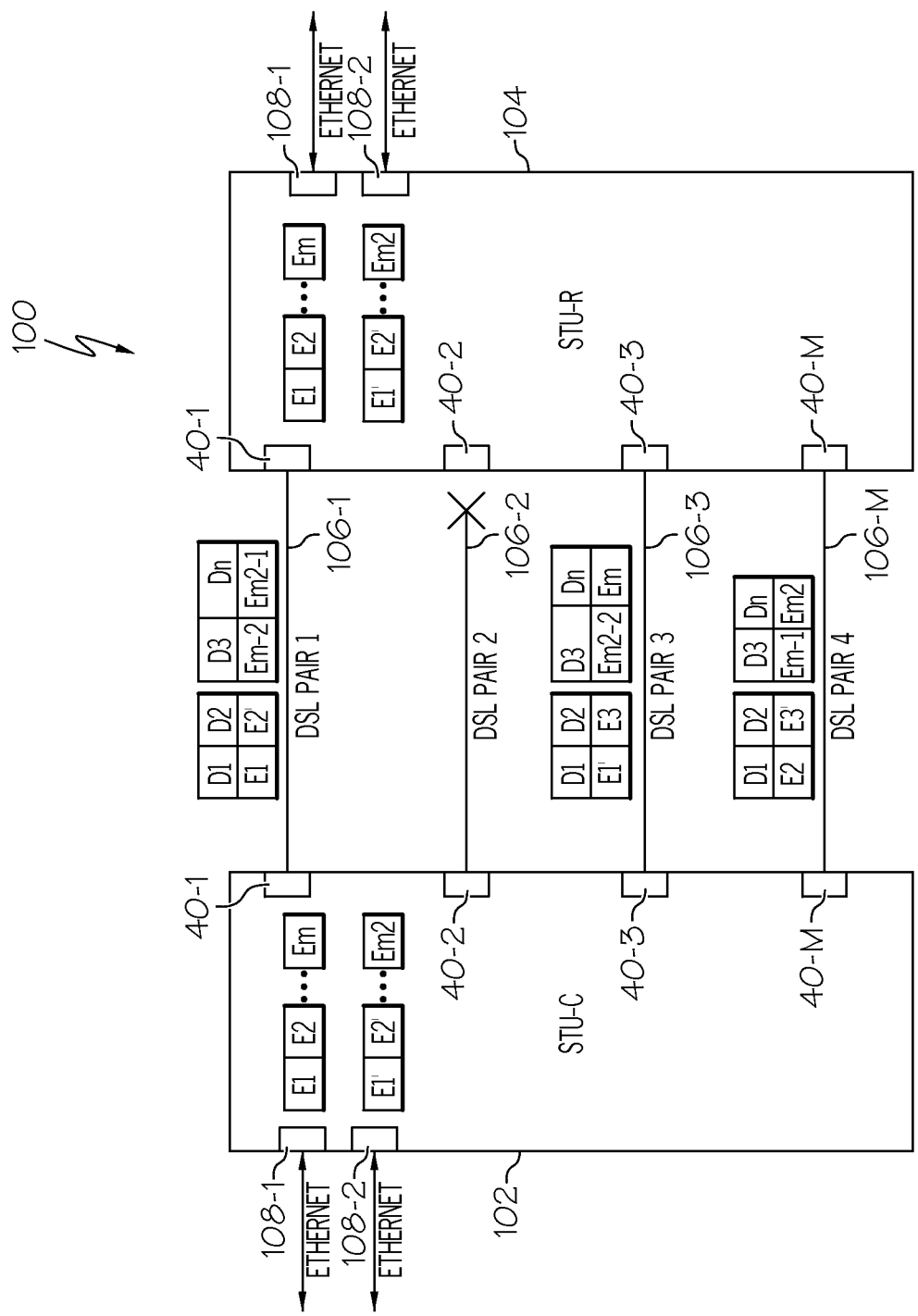

The procedures described above for compensating for failure of a DSL pair are also applicable to embodiments in which more than one application port 108 is used. For example, as shown in the example of FIG. 1F, the bandwidth for both application ports 108-1 and 108-2 is reduced as described above with respect to one application port. The timeslot map is updated to interleave the timeslots circularly and in parallel, as in FIG. 1E, taking into account the failure of DSL pair 106-2. It is to be understood that in other embodiments, the timeslot map is updated to interleave the timeslots circularly and serially, as in FIG. 1D, taking into account any failed DSL pairs, as described above. Additional details regarding the N good pairs in M pair mode are described in co-pending U.S. patent application Ser. No. 13/187,306.

N+N Protection Switching

Figure 2A:
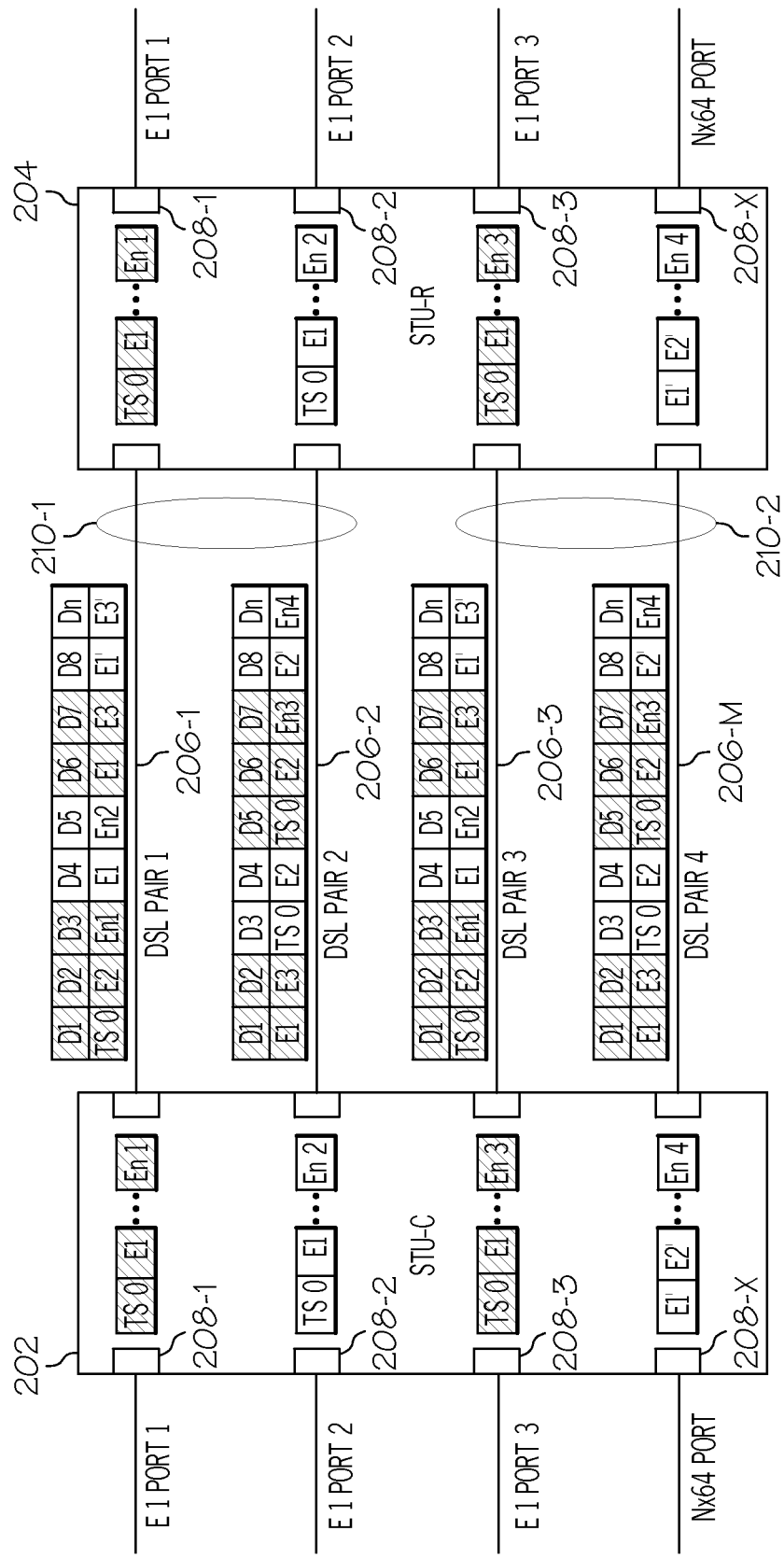
FIGS. 2A-2C are block diagrams of other embodiments of a communication system.
Figure 2B:
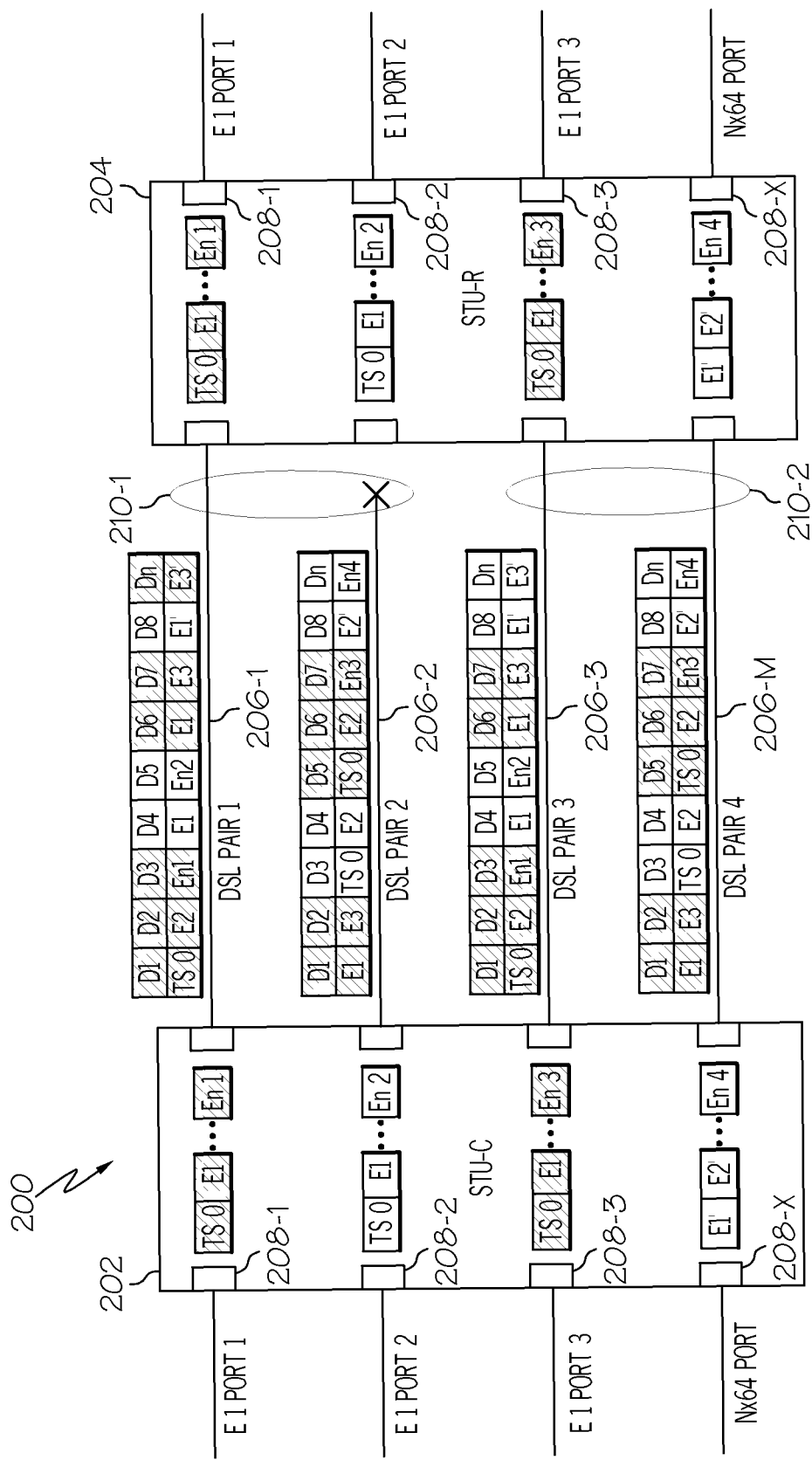

FIG. 2A is a block diagram of an embodiment of another system 200. System 200 includes a central unit 202 and a remote unit 204. Each of the central unit 202 and the remote unit 204 include a plurality of application ports 208-1 . . . 208-X. In this example, application ports 208-1, 208-2 and 208-3 are configured for an E1 interface format. The E1 interface format is an E-carrier format defined by the G.703 standard. In other embodiments, other formats are used, such as other E-carrier or T-carrier formats defined by the G.703 standard. The E1 interface format is a non-elastic service. A non-elastic service, such as Nx64k or E1, requires a fixed number of timeslots or the transmission will typically fail. Thus, a non-elastic service cannot complete transmission over a reduced number of timeslots if one of the DSL pairs 106 fails. In contrast, an elastic service is defined as a service for which the data can be divided into varying numbers of DSL timeslots. In other words, an elastic service does not require a fixed number of DSL timeslots.

As described above, the E1 interface format typically fails if the allocated number of timeslots is not available. Similarly, the application port 208-X is implemented, in this embodiment, according to the Nx64k interface format. The Nx64k interface format is a non-elastic timeslot based format, which is configured with rates up to 178 timeslots. Nx64k is a generic term and an application port for Nx64k format can be configured according to V.35, V.36, X.21, or RS-530 standards.

The DSL units 202 and 204 are communicatively coupled together via a plurality of DSL pairs 206-1 . . . 206-M, where M represents the number of DSL pairs. In the embodiment shown in FIG. 2A, there are four DSL pairs. However, it is to be understood that, in other embodiments, other even numbers of DSL pairs are used. Each DSL pair 206 is connected to a respective DSL port 40 in each of DSL units 202 and 204. In this embodiment, each of DSL units 202 and 204 are configured according to the G.SHDSL standard.

In the embodiment shown in FIG. 2A, the M DSL pairs are divided into 2 groups 210-1 and 210-2. Each group is comprised of N DSL pairs 206, where N=M/2. Thus, in this embodiment, each group is comprised of 2 DSL pairs 206. In addition, the groups do not have DSL pairs in common. That is, a DSL pair is only a member of one group. Hence, in the example of FIG. 2A, group 210-1 includes DSL pairs 206-1 and 206-2 while group 210-2 includes DSL pairs 206-3 and 206-M. However, it is to be understood that, in other embodiments, each group is comprised of more than 2 DSL pairs 206. In such embodiments, each group 210 still has the same number of DSL pairs 206 as the other groups since the total number of DSL pairs is even for embodiments implementing the protection switching shown in FIG. 2A.

Each DSL unit 202 and 204 utilizes the aggregate group bandwidth of the DSL pairs 206 in each group 210. For example, the aggregate group bandwidth for group 210-1 is the total bandwidth of DSL pair 206-1 and DSL pair 206-2 together. Similarly, the aggregate group bandwidth for group 210-2 is the total bandwidth of DSL pair 206-3 and DSL pair 206-M. As discussed above, the DSL units 202 and 204 utilize the aggregate bandwidth by interleaving the timeslots. In particular, the timeslots from application ports 208-1 . . . 208-X are interleaved between DSL pairs 206-1 and 206-2 in group 210-1. Similarly, copies of the timeslots from application ports 208-1 . . . 208-X are also interleaved between DSL pairs 206-3 and 206-M of group 210-2. Thus, the data carried by the aggregate bandwidth of group 210-1 is the same as the data carried by the aggregate bandwidth of group 210-2.

In particular, in the example shown in FIG. 2A, first the timeslots TS0 to En1, where n1 is the total number of timeslots allocated to the application port 208-1, are interleaved circularly between DSL pairs 206-1 and 206-2, as described above. Then, once interleaving the timeslots from application port 208-1 is complete, the timeslots TS0 to En2, where n2 is the total number of timeslots allocated to the application port 208-2, are interleaved circularly between DSL pairs 206-1 and 206-2. This serial pattern continues until the timeslots, E1 to En4, of the last application port 208-X are interleaved between DSL pairs 206-1 and 206-2.

Figure 2C:
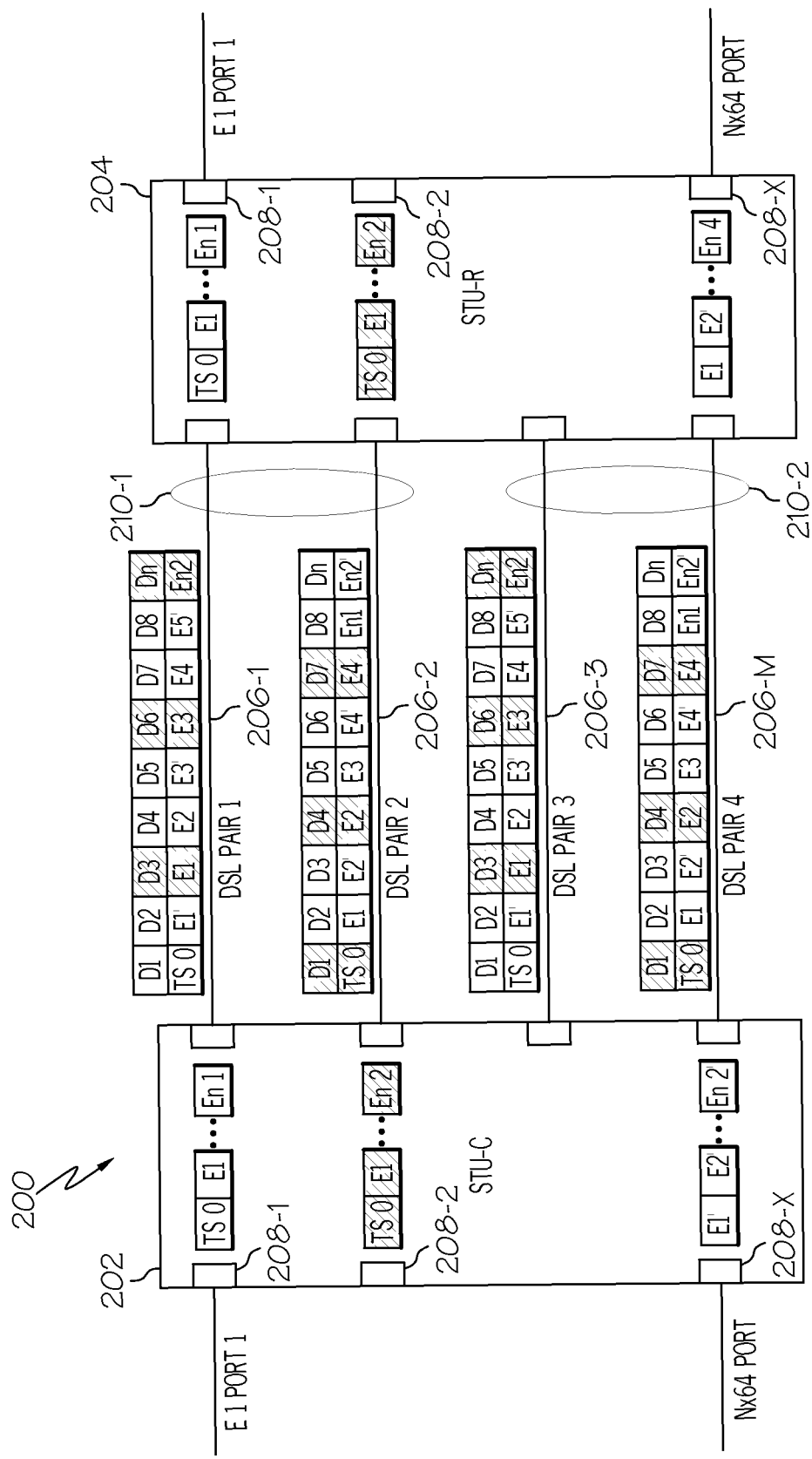

In an alternative embodiment, the timeslots are not interleaved one application port at a time (i.e. serially). Rather, the timeslots from the plurality of application ports 208 are interleaved circularly and in parallel, as shown in the example in FIG. 2C. For purposes of explanation only three ports 208-1, 208-2 and 208-X are depicted in FIG. 2C. However, it is to be understood that two ports or more than three ports are implemented in other embodiments. Interleaving the timeslots in parallel includes assigning a first time slot from the first application port 208-1 to the first DSL pair 206-1 in the group 210-1. Then a first timeslot from the second application port 208-2 is assigned to the second DSL pair 206-2 in group 210-1. A first time slot from the third application port 208-X is then assigned to the next time slot of the first DSL pair 206-1 in the group 210-1. This is followed by assigning a second timeslot from the first application port 208-1 to the next timeslot of the second DSL pair 206-2. This pattern continues until all the timeslots from each application port have been assigned, with each timeslot from one application port followed by a timeslot from another application port.

The same pattern used to interleave the timeslots in group 210-1 is also used in interleaving copies of the timeslots from application ports 208-1 . . . 208-X between DSL pairs 206-3 and 206-M in group 210-2. Thus, each group 210 contains the same physical layer payload. One of the groups 210 is designated as the default working or protected group (also referred to herein as the active group) and the other group is designated as the standby or protecting group (also referred to herein as the backup group). In this embodiment, the working group is group 210-1. The working group or active group is defined as the group over which the data is transported that both DSL units 202 and 204 are forwarding to the respective application ports 208. The protecting group in this example is group 210-2. Although the physical layer payload of the protecting group is the same as the active group, each of the DSL units 202 and 204 are configured to use only the data from the working group for forwarding to the application ports 208.

DSL unit 202 transmits the same data over both the working group 210-1 and the protecting group 210-2. Similarly, DSL unit 204 transmits the same data over both the working group 210-1 and the protecting group 210-2. If one of the DSL pairs in the working group 210-1 has a failure, such as DSL pair 206-2 shown in FIG. 2B, each of DSL units 202 and 204 is configured to switch to the protecting group 210-2. That is, each DSL unit 202 and 204 begin processing the signals from the DSL pairs in the protecting group 210-2. Thus, data from elastic and non-elastic services can be protected since each group 210 carries the same data and the bandwidth available in each group is the same.

In some embodiments, at least some of the application ports 208 are implemented using an elastic service, such as Ethernet. In some such embodiments, after switching to the protecting group 210-2, the DSL units 202 and 204 are configured to transition from N+N protection switching mode to N Good Pairs in M-Pair mode if one of the DSL pairs in the protecting group 210-2 also fails. That is, a timeslot map is created to distribute the timeslots to the remaining DSL pairs 210 not coupled to the failed DSL link. Thus, the N+N protection switching is used to protect against lost data when a DSL pair fails in the working group and the N good pairs mode is subsequently used to increase the available bandwidth for transmission of the data when a DSL pair fails in the protecting group. Additionally, in some such embodiments, if the failed DSL pair in the protecting and/or working group subsequently recovers, the DSL units 202 and 204 are configured to revert to N+N protection switching with the groups 210-1 and 210-2.

It is to be understood that in other embodiments, the system 200 is not configured to switch to N good pairs mode or is not configured to revert to N+N protection switching when one of the failed DSL pairs recovers. In addition, it is to be understood that if some of the application ports 208 are not implemented using an elastic service, data from those ports is not transported using the N good pairs mode. In other words, only the data from ports using elastic services are transported using the N good pairs mode even if each DSL unit also includes ports implemented using a non-elastic service. In embodiments configured to revert to N+N protection mode, data from such non-elastic service ports is again transported between the DSL units.

Figure 3:
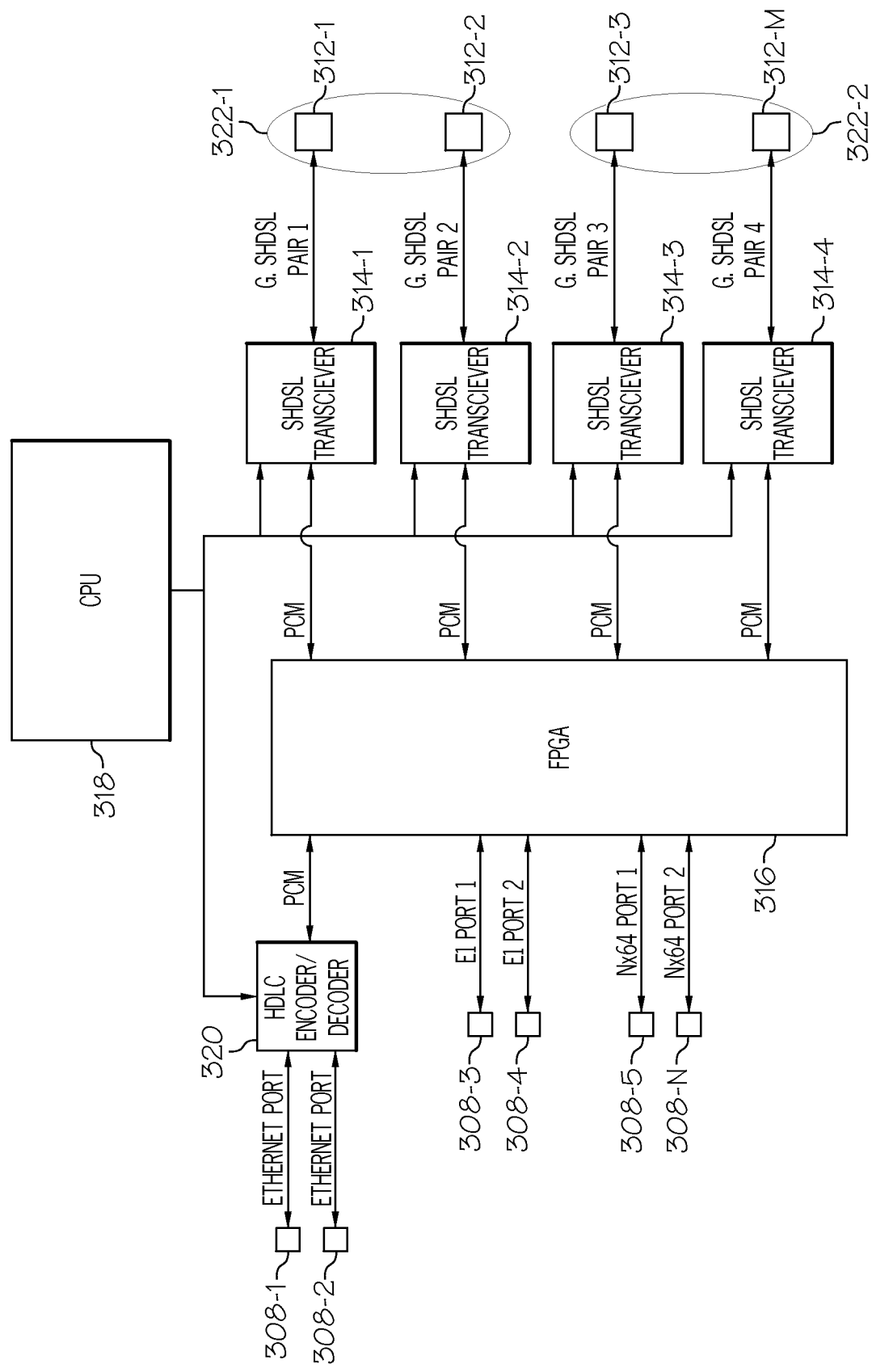
FIG. 3 is a block diagram of one embodiment of a communication unit.

FIG. 3 is a block diagram of one embodiment of a communication unit 300 configured to implement N+N protection switching. The communication unit 300 can be implemented as a central unit or a remote unit, such as central unit 202 and remote unit 204 described above. The communication unit 300 includes a plurality of application ports 308. In the example shown in FIG. 3, at least some of the application ports 308 are configured to transport a non-elastic service. For example, in the embodiment shown in FIG. 3, application ports 308-3 and 308-4 are configured to transport E1 signals and application ports 308-5 and 308-6 are configured to transport Nx64 signals. In addition, in this example, application ports 308-1 and 308-2 are configured to transport elastic Ethernet frames as described above.

The communication unit 300 also includes a plurality of DSL ports 312-1 ... 312-M divided into two groups 322-1 and 322-2. Each group 322-1/322-2 includes the same number of DSL ports 312 as the other group. Each DSL port 312 is configured to transport DSL frames to another communication unit. Each of the DSL ports 312-1 ... 312-M is coupled to a respective DSL chipset or transceiver 314-1 ... 314-M. In particular, in this example, the DSL transceivers 314-1 ... 314-M are configured according to the Global.standard High-Bit-Rate Digital Subscriber Line (G.SHDSL) standard defined in the ITU-T Standard G.991.2. Each of the DSL transceivers 314-1 ... 314-M and a field programmable gate array (FPGA) 316 receives corresponding portions of a timeslot map from a central processing unit (CPU) 318. The transceivers 314-1 ... 314-M receive the actual timeslots defined by the timelot map from the FPGA 316 for the transmit direction to the other DSL unit and send the actual timeslots to the FPGA 316 in the receive direction from the other DSL unit.

Notably, although an FPGA is used in this example, embodiments of the present invention are not to be so limited. For example, in other embodiments, an application specific integrated circuit (ASIC) can be used. Each PCM stream from the FPGA 316 to the DSL transceivers 314-1 ... 314-M contains the entire timeslot map. Each transceiver 314 is configured at certain events, such as initialization and/or protection events, with the timeslot map for the respective transceiver 314.

The timeslot map indicates which timeslots are to be processed by the respective DSL transceiver 314-1 ... 314-M. For example, the timeslot map may indicate that DSL transceiver 314-1 in group 322-1 and DSL transceiver 314-3 in group 322-2 are to insert timeslots 1, 5, and 10 from a PCM stream received from the FPGA 316 into a DSL frame for transmission over the DSL ports 312-1 and 312-3, respectively. The FPGA 316 is the functional block responsible for handling timeslot allocation based on the timeslot map. For example, the CPU 318 creates the timeslot maps used to interleave the timeslots as described above. The CPU 318 configures the FPGA 316 and the DSL transceivers 314-1 ... 314-M with the timeslot map. In addition, the CPU 318 receives event notification for the DSL transceivers 314-1 ... 314-M, such as indication of a failed DSL pair. The CPU 318 is also responsible for creating a new timeslot map to reflect the current system state based on a failed DSL pair. In addition, the CPU 318 is responsible for configuration, status, and error handling of the communication unit 300. The FPGA 316 is responsible for transporting the data to and from the application ports 308 and the DSL ports 312.

The communication unit 300 also includes one or more HDLC encoder/decoders 320. The HDLC encoders/decoder 320 is provided between the Ethernet ports 308-1/308-2 and the FPGA 316 to HDLC encode/decode an Ethernet signal. In particular, when an Ethernet frame is input at one of the Ethernet ports 308-1 and 308-2, the frame is passed to the HDLC encoder/decoder 320 where the sync byte and start of frame byte of the Ethernet frame are removed to form a stripped Ethernet frame. The HDLC encoder/decoder 320 also appends a two byte cyclic redundancy check (CRC) to the stripped Ethernet frame. HDLC flags with the pattern "01111110" are also inserted at the beginning and end of the frame. The HDLC flags are used to identify the start and end of a frame.

The Ethernet frame plus CRC is then examined for a continuous bit sequence of five 1's (that is, 11111). A zero is inserted at the end of each sequence of five 1's (that is, 11111). Zero insertion after a sequence of five 1s in the payload is used to avoid confusion of payload with HDLC flags at the beginning and end of the frame. The HDLC encoded Ethernet frame is then inserted into a time division multiplex (TDM) stream, such as a PCM stream. In the reverse direction, the HDLC flags are removed from the start and end of the frame. Similarly, the inserted "0" in the sequence "111110" is removed as well as the appended two byte CRC. The remaining Ethernet frame is then formatted with start of frame and sync bytes and passed to the corresponding application port 308-1/308-2 configured for Ethernet signals.

The HDLC encoded frame is provided to the FPGA 316. The FPGA 316 is connected to the HDLC encoder 320 by a PCM TDM byte stream. The PCM TDM byte stream includes timeslots in a framed format. Thus, the FPGA 316 only operates on the timeslots. The HDLC encoding and decoding is performed in the HDLC encoder 320. Similarly, timeslots from the non-elastic service ports 308-3, 308-4, 308-5, and 308-N are provided to the FPGA 316. The FPGA 316 is configured to interleave copies of the timeslots from each of the application ports 308-1 . . . 308-N between the DSL pairs of each group 322. In particular, in this example, the FPGA 316 interleaves the timeslots between the DSL pairs 312-1 and 312-2 of group 322-1 based on the timeslot map received from the CPU 318. Copies of the same timeslots are also interleaved between the DSL pairs 312-3 and 312-M of group 322-2. As described above, in some embodiments, the timeslots are interleaved circularly and serially between the respective DSL pairs of each group 322. In other embodiments, the timeslots are interleaved circularly and in parallel. The interleaved timeslots are provided from the FPGA 316 to the respective DSL chipsets 314-1 . . . 314-M. Each of the respective chipsets 314-1 . . . 314-M insert the timeslots into a DSL frame and transport the timeslots over the respect DSL pair 312-1 . . . 312-M.

Each of the respective chipsets 314-1 . . . 314-M is also configured to extract timeslots received from the respective DSL pair and pass the extracted timeslots to the FPGA 316 via a respective PCM stream. One of the groups 322-1 and 322-2 is designated as the active group and the other is designated as a backup group. Thus, the FPGA 316 is configured to de-interleave the timeslots of the active group and provide the timeslots to the respective application port 308-1 . . . 308-N. In this embodiment, the active group is the group 322-1. If one of the DSL pairs in the active group 322-1 fails, the FPGA 316 is configured to de-interleave the timeslots from the backup group 322-2 and provide the timeslots to the respective application ports 308-1 . . . 308-N. Thus, the backup group becomes the active group. In this way, few to no timeslots are lost due to the failure of one of the DSL pairs in the active group 322. In some embodiments, if the failed DSL pair subsequently recovers, the group with the recovered DSL pair becomes the active group again. In other embodiments, the group with the recovered DSL pair becomes the backup group. Which group becomes the backup group is configured by the CPU 318.

Furthermore, in some embodiments, after switching to the backup group 322-2, the FPGA 316 is configured to transition from N+N protection switching to the N good pairs in M pair mode described above if there is a failure in one of the DSL pairs in the backup group 322-2. That is, the FPGA 316 assigns a new timeslot map in which the timeslots from ports configured for an elastic service are interleaved among all the remaining good DSL pairs rather than using groups 322-1 and 322-2. In some embodiments, after the failed DSL pair recovers, the FPGA 316 is configured to transition back to N+N protection switching. In other embodiments, the FPGA 316 is configured to assign a new timeslot map to include the recovered DSL pair in the N good pairs in M-pair mode.

Figure 4:
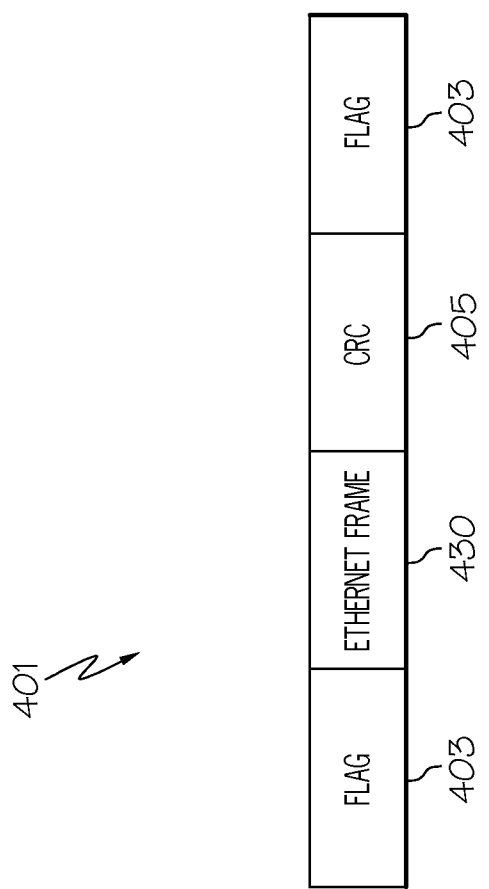
FIG. 4 depicts one embodiment of the data structure of high-level data link control encoding.

FIG. 4 shows one embodiment of the data structure 401 of the HDLC encoding. The data structure 401 includes two flags 403, each of which is one binary byte 01111110. The CRC 405, in this example, is 16 bits long and is created using the polynomial X16+X12+X5+1. The Ethernet frame 401 and the cyclic redundancy check 405 are bitwise checked. If a contiguous sequence of five ones (11111) are found, a zero is inserted so that no pattern between the start of the Ethernet frame 430 and the end of cyclic redundancy check 405 can resemble a flag (01111110). This prevents erroneous detection of flags within the Ethernet frame 401 or cyclic redundancy check. The HDLC flags are used to identify the start and end of a frame. The HDLC encoder/decoders 320 then insert the encoded frame into a time division multiplex (TDM) byte stream and pass the TDM stream to FPGA 316.

Likewise, when a frame is prepared for egress from the DSL unit 300 via one of the Ethernet ports 30-1/308-28, FPGA 316 extracts the corresponding timeslots from the PCM stream received from the respective chipset 314 and passes the timeslots to the corresponding HDLC encoder/decoder 320 in a TDM byte stream. The TDM byte stream is examined in the HDLC encoder/decoder 320 for HDLC frames by searching for HDLC flags. When a frame is detected, the HDLC encoder/decoder 320 removes the HDLC flags from the start and end of the frame. Similarly, the inserted "0" in the sequence "111110" is removed as well as the appended two byte CRC in HDLC encoder/decoder 320 as discussed above. Before removal, the CRC is used for error detection. The HDLC encoder/decoder 320 then prepends the start of frame and sync bytes to the frame and passes the Ethernet frame to the corresponding Ethernet port 308-1/308-2 where the frame is transmitted.

FIG. 5 is a flow chart depicting one embodiment of a method 500 of communication in a system. The method 500 can be implemented in a communication unit such as communication units 202 and 204 in system 200 described above. At block 502, data is received over at least one application port. The application port can be implemented using an elastic or a non-elastic service. For example, the application port can be implemented according to one of an Ethernet format, a G.703 format, and an Nx64k format. In addition, when more than one application port is included, each application port can be implemented using either an elastic or a non-elastic service.

At block 504, a first copy of the data received from the at least one application port is interleaved across a first plurality of DSL ports forming a first group of DSL ports in the communication unit. At block 506, a second copy of the data received from the at least one application port is interleaved across a second plurality of DSL ports forming a second group of DSL ports in the communication unit. Thus, the second group contains the same physical layer payload as the first group. In addition, each DSL port only belongs to one group.

In some embodiments, the data is interleaved circularly and serially across the plurality of DSL ports in each of the first and second groups. Circularly interleaving the data refers to assigning a first PCM timeslot to a first one of the plurality of DSL ports, the next PCM timeslot to the next DSL port, the third PCM timeslot to the next DSL port, and so forth until a PCM timeslot has been assigned to each of the DSL ports.

After a timeslot has been assigned to each of the DSL ports, the next PCM timeslot is assigned to the first DSL port, etc. Serially refers to assigning all the data from the at least one application ports, one application port at a time. In other words, in embodiments with more than one application port, all the data from the first application port is assigned circularly across the plurality of DSL ports. Once all the data from the first application port has been assigned, the data from the next application port is assigned circularly across the plurality of DSL ports, etc.

It is to be understood that in other embodiments, the data from the at least one application port is interleaved in a different manner. For example, in some embodiments, the data is interleaved circularly and in parallel across the plurality of DSL ports in each respective group. That is, the timeslots are not interleaved one application port at a time. For example, a first time slot from a first application port is assigned to the first DSL port in the respective group. Then, a first timeslot from a second application port is assigned to the first DSL port and so forth until a first timeslot from each of the application ports is assigned to the first DSL port in the respective group. Similarly, a second timeslot from the first application port is assigned to the second DSL port in the respective group and so forth until a second timeslot from each of the application ports is assigned to the second DSL port in the respective group. This pattern continues until the timeslots from each of the application ports has been assigned to a DSL port in each of the respective groups.

At 508, only data received over the active group is forwarded to the at least one application port. In this example, the first group is designated as the active group and the second group is designated as the backup group. At block 510, it is determined if a failure has been detected on a DSL link coupled to one of the DSL ports in the first group. When a failure is detected at block 510, forwarding data received from the first group is ceased and only data received over the second group is forwarded to the at least one application port at block 512.

In addition, in some embodiments, at least one of the application ports implements an elastic service such as Ethernet. In some such embodiments, if a failure is detected on a DSL link coupled to one of the DSL ports in the second group at block 514, the N+N protection switching mode is optionally transitioned to N good pairs in M pair mode at block 516. That is, a copy of the data received from the at least one application port implementing an elastic service is interleaved across all the remaining DSL ports not connected to the failed DSL links in both the first and second groups. In some such embodiments, the N good pairs in M pair mode transition back to the N+N protection switching mode if the failed DSL link recovers. That is, respective first and second copies of the data are interleaved over the respective first and second groups as described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communication system comprising:
   a plurality of digital subscriber line (DSL) links comprising a first group of DSL links and a second group of DSL links, each of the first and second groups comprising more than one DSL link, wherein the first group comprises the same number of DSL links as the second group;
   a first node having at least one application port and a plurality of DSL ports, each DSL port coupled to a respective one of the plurality of DSL links;
   a second node having at least one application port and a plurality of DSL ports, each DSL port coupled to a respective one of the plurality of DSL links such that the first and second nodes are communicatively coupled via the plurality of DSL links;
   wherein each of the first and second nodes is configured to interleave a first copy of data received over the respective at least one application port across the first group of DSL links and to interleave a second copy of the data received over the respective at least one application port across the second group of DSL links;
   wherein the first group is designated as an active group and the second group is designated as a back-up group;
   wherein when a failure is detected on one of the DSL links in the first group, each of the first and second nodes is configured to switch from the first group to the second group;
   wherein each of the first and second nodes is configured to interleave the first copy of the data circularly and serially across the first group of DSL links and to interleave the second copy of the data circularly and serially across the second group of DSL links, or to interleave the first copy of the data circularly and in parallel across the first group of DSL links and to interleave the second copy of the data circularly and in parallel across the second group of DSL links.

2. The system of claim 1, wherein each of the first and second DSL nodes is configured to transport data over the plurality of DSL links according to the G.SHDSL standard.

3. The system of claim 1, wherein each of the at least one application ports is configured for an elastic service; and
   wherein, after switching to the second group, each of the first and second nodes is configured to interleave a copy of the data received from its respective at least one application port across all the remaining DSL ports not connected to the failed DSL link in both the first and second groups without adjusting a set of DSL timeslots allocated to each of the remaining DSL ports for transport of the data from its respective at least one application port.

4. The system of claim 1, wherein each of the at least one application ports is configured according to one of an Ethernet format, a G.703 format, and an Nx64k format.

5. The system of claim 1, wherein when the failed DSL link recovers, each of the first and second nodes is configured to switch from the second group to the first group.

6. A communication unit comprising:
   a plurality of application ports;
   a plurality of digital subscriber line (DSL) ports, wherein the plurality of DSL ports comprise a first group of DSL ports and a second group of DSL ports, each of the first and second groups comprising more than one DSL port, wherein the first group comprises the same number of DSL ports as the second group;
   a plurality of DSL transceivers each coupled to a respective DSL link via a respective DSL port; and
   a processing circuit coupled to the at least one application port and the plurality of DSL transceivers, the processing circuit configured to configured to provide a copy of data received from the plurality of application ports to each of the plurality of DSL transceivers via a respective data stream comprising timeslots, the processing circuit further configured to provide a timeslot map to each of the DSL transceivers, the timeslot map indicating which of the timeslots in the data stream are to be processed by each respective DSL transceiver such that a first copy of data received over the plurality of application ports is interleaved across the first group of DSL ports and a second copy of the data received over the plurality of application ports is interleaved across the second group of DSL ports;

wherein the first group is designated as an active group and the second group is designated as a back-up group;

wherein when a failure is detected on one of the DSL links coupled to a DSL port in the first group, the processing circuit is configured to switch from processing data received from the first group to processing data received from the second group;

wherein the processing circuit is configured to provide a timeslot map such that a first copy of data from the plurality of application ports is interleaved across the plurality of DSL ports in the first group circularly and serially and a second copy of the data from the plurality of application ports is interleaved across the plurality of DSL ports in the second group circularly and serially, or such that a first copy of data from the plurality of application ports is interleaved across the plurality of DSL ports in the first group circularly and in parallel and a second copy of the data from the plurality of application ports is interleaved across the plurality of DSL ports in the second group circularly and in parallel.

7. The communication unit of claim 6, wherein the processing circuit is a field programmable gate array (FPGA).

8. The communication unit of claim 6, wherein each of the at least one application ports is configured according to one of an Ethernet format, a G.703 format, and an Nx64k format.

9. The communication unit of claim 8, wherein the at least one application port is configured according to the Ethernet format; wherein the communication unit further comprises one or more high-level data link (HDLC) encoders configured to HDLC encode an Ethernet signal received over the at least one application port.

10. The communication unit of claim 6, wherein each of the DSL transceivers is configured according to the G.SHDSL standard.

11. The communication unit of claim 6, wherein each of the at least one application ports is configured for an elastic service; and wherein, after switching to the second group, the processing circuit is configured to update the timeslot map to interleave a copy of the data received from its respective at least one application port across all the remaining DSL ports not connected to the failed DSL link in both the first and second groups without adjusting a set of DSL timeslots allocated to each of the remaining DSL ports for transport of the data from its respective at least one application port.

12. A method of communication in a network, the method comprising:

receiving data from at least one application port in a communication unit;

interleaving a first copy of the data received from the at least one application port across a first plurality of DSL ports forming a first group of DSL ports in the communication unit;

interleaving a second copy of the data received from the at least one application port across a second plurality of DSL ports forming a second group of DSL ports in the communication unit, wherein each of the first and second groups comprise the same number of DSL ports;

forwarding only data received via the first group of DSL ports over the at least one application port; and when a failure is detected on a DSL link coupled to one of the DSL ports in the first group of DSL ports, forwarding only data received via the second group of DSL ports over the at least one application port;

wherein interleaving the data received from the at least one application port across the first plurality of DSL ports and interleaving the data received from the at least one application port across the second plurality of DSL ports each comprises interleaving the data circularly and serially across the respective first and second plurality of DSL ports or interleaving the data circularly and in parallel across the respective first and second plurality of DSL ports.

13. The method of claim 12, wherein each of the at least one application ports is configured for an elastic service; and further comprising, when the failure is detected on a DSL link coupled to one of the DSL ports in the first group of DSL ports, interleaving a copy of the data received from the at least one application port across all the remaining DSL ports not connected to the failed DSL link in both the first and second groups without adjusting a set of DSL timeslots allocated to each of the remaining DSL ports for transport of the data from the at least one application port.

14. The method of claim 12, wherein each of the at least one application ports is configured according to one of an Ethernet format, a G.703 format, and an Nx64k format.

* * * * *